United States Patent
Nemati et al.

(10) Patent No.: US 10,395,210 B2
(45) Date of Patent: Aug. 27, 2019

(54) SYSTEM AND METHOD FOR USING STORES AS RECEIVING POINTS FOR THIRD PARTY, E-COMMERCE SUPPLIERS

(71) Applicant: Walmart Apollo, LLC, Bentonville, AR (US)

(72) Inventors: Behzad Nemati, Springdale, AR (US); Ehsan Nazarian, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/960,680

(22) Filed: Apr. 24, 2018

(65) Prior Publication Data

US 2018/0308051 A1    Oct. 25, 2018

Related U.S. Application Data

(60) Provisional application No. 62/489,106, filed on Apr. 24, 2017.

(51) Int. Cl.
*G06N 20/00* (2019.01)
*G06Q 10/08* (2012.01)

(52) U.S. Cl.
CPC ....... *G06Q 10/08345* (2013.01); *G06N 20/00* (2019.01); *G06Q 10/087* (2013.01)

(58) Field of Classification Search
CPC .......... G06Q 10/08345; G06Q 10/087; G06N 99/005
USPC .......................................................... 705/28
See application file for complete search history.

(56) References Cited

U.S. PATENT DOCUMENTS

| | | | |
|---|---|---|---|
| 7,610,218 B2 | 10/2009 | Bodmer et al. | |
| 8,527,373 B1 | 9/2013 | Ricci et al. | |
| 8,577,740 B1 | 11/2013 | Murray et al. | |
| 2005/0273376 A1* | 12/2005 | Ouimet | G06Q 10/04 705/7.31 |

(Continued)

FOREIGN PATENT DOCUMENTS

| | | |
|---|---|---|
| WO | 2002037234 A2 | 5/2002 |
| WO | 2015116038 A1 | 8/2015 |

OTHER PUBLICATIONS

International Search Report and Written Opinion dated Aug. 8, 2018 in corresponding International Application No. PCT/US18/29184 (10 pp).

*Primary Examiner* — A. Hunter Wilder
*Assistant Examiner* — Joseph M Mutschler
(74) *Attorney, Agent, or Firm* — Venable LLP; Jeffri A. Kaminski

(57) ABSTRACT

Systems, methods and computer-readable media for providing e-commerce suppliers an alternative shipping and distribution system based on real-time sales and demand being coupled with iterative machine learning processes. As an example, an e-commerce supplier can contract with a retailer to have products sold in retail locations belonging to the retailer. However, rather than the retailer providing to the e-commerce supplier a quoted price for acquiring the merchandise, the retailer can provide two prices: one for if the e-commerce supplier delivers the merchandise to a distribution center, and another if the e-commerce supplier delivers the merchandise directly to a retail location, from which the retailer will redistribute the merchandise to other retail locations.

17 Claims, 5 Drawing Sheets

(56) References Cited

U.S. PATENT DOCUMENTS

| | | | |
|---|---|---|---|
| 2007/0156510 A1* | 7/2007 | Kim | G06Q 10/04 |
| | | | 705/7.31 |
| 2008/0004981 A1 | 1/2008 | Gopalpur et al. | |
| 2010/0205044 A1* | 8/2010 | Scheer | G06Q 10/087 |
| | | | 705/28 |
| 2014/0143099 A1 | 5/2014 | Wilkins | |
| 2014/0156348 A1 | 6/2014 | Sinkel | |
| 2014/0337134 A1 | 11/2014 | Bugenhagen | |
| 2015/0109287 A1 | 4/2015 | Grichnik et al. | |
| 2015/0134413 A1* | 5/2015 | Deshpande | G06Q 30/0202 |
| | | | 705/7.31 |
| 2018/0218312 A1* | 8/2018 | Smith | G06Q 10/087 |

* cited by examiner

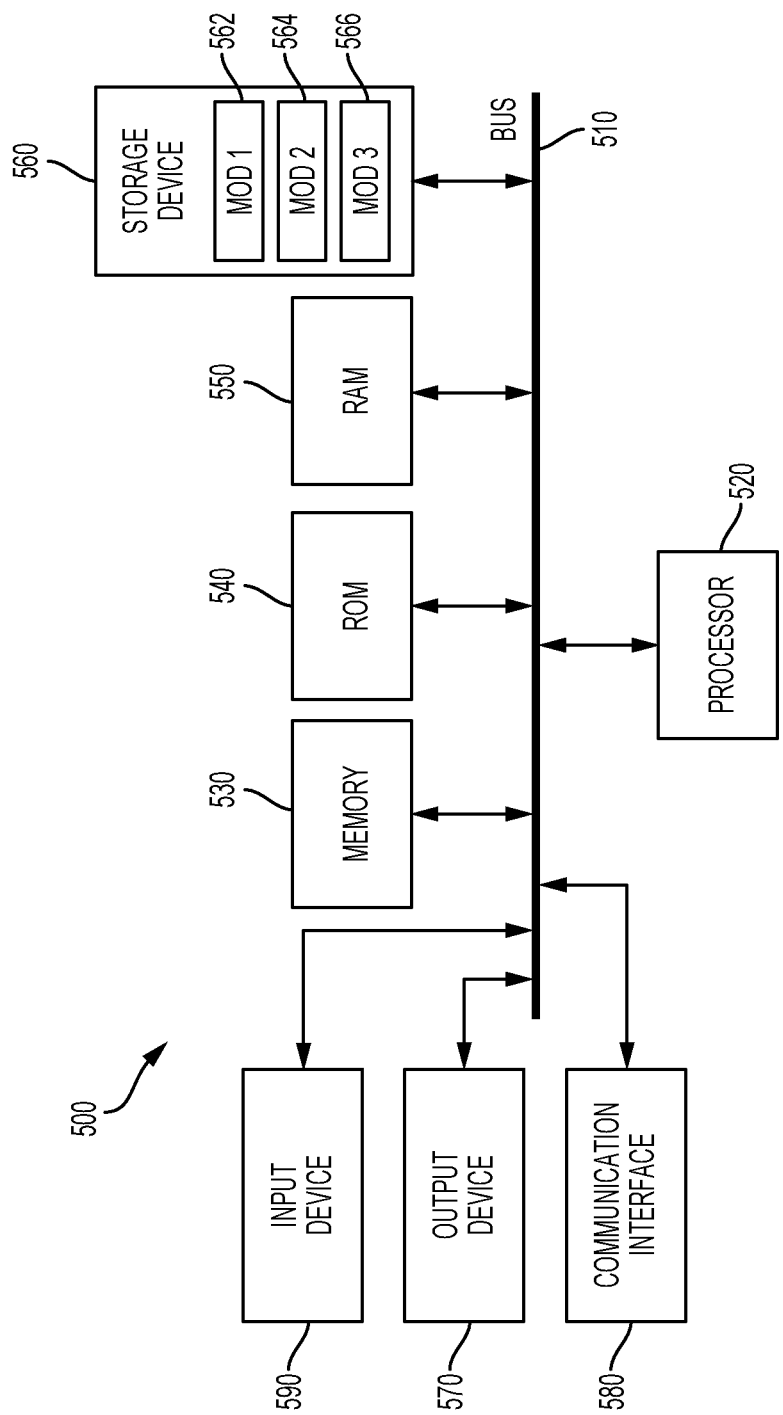

SYSTEM AND METHOD FOR USING STORES AS RECEIVING POINTS FOR THIRD PARTY, E-COMMERCE SUPPLIERS

BACKGROUND

1. Technical Field

The present disclosure relates to receiving merchandise from third party, e-commerce suppliers at a retail location, then distributing the received merchandise to other retail locations.

2. Introduction

Product distribution systems often follow a model where the manufacturer of a product delivers a finished product to a distribution center for a retailer, then the retailer transports the product from the distribution center to nearby retail locations. For example, a manufacturer of toothpaste who has contracted with a retailer to sell the toothpaste in retail stores will deliver a truckload of toothpaste product to a distribution center associated with the retailer. The retailer will then send trucks from the distribution center to retail locations for sale to customers, each truck having some toothpaste as well as other products. In some cases, suppliers will have their own retail locations, termed "outlet stores." However, for e-commerce suppliers, sale of products within a brick and mortar retail location is generally not possible unless the e-commerce suppliers contract with retailers and deliver the merchandise to distribution centers.

SUMMARY

An exemplary method for practicing concepts disclosed herein can provide third party suppliers multiple price costs for distributing a product from distinct points of distribution. Such a method can include: receiving, at a server, historical sales data associated with a third party e-commerce product; applying a machine learning algorithm to the historical sales data, to yield a predicted demand quantity for the third party e-commerce product at a plurality of retail locations, wherein the machine learning algorithm is updated on a periodic basis; receiving an offer for the predicted demand quantity of the third party e-commerce product from a third party supplier; calculating, using a processor of the server, a first shipping cost for receiving the predicted demand quantity from the third party supplier at a single retail location in the plurality of retail locations, and subsequently redistributing the predicted demand quantity to remaining retail locations in the plurality of retail locations; calculating, using the processor, a second shipping cost for receiving the predicted demand quantity from the third party supplier at a distribution center and redistributing the predicted demand quantity to remaining retail locations in the plurality of retails locations; and transmitting, in response to the offer, the first shipping cost and the second shipping cost to the third party supplier.

An exemplary system configured to practice principles described herein can be configured to include: a processor; and a computer-readable storage medium having instructions stored which, when executed by the processor, cause the processor to perform operations comprising: applying a machine learning algorithm to historical sales data for a third party e-commerce product, to yield a predicted demand quantity for the third party e-commerce product at a plurality of retail locations; calculating a first shipping cost for receiving the predicted demand quantity from a third party supplier of the third party e-commerce product at a single retail location in the plurality of retail locations, and subsequently redistributing the predicted demand quantity to remaining retail locations in the plurality of retail locations; calculating a second shipping cost for receiving the predicted demand quantity from the third party supplier at a distribution center and redistributing the predicted demand quantity to remaining retail locations in the plurality of retails locations; and transmitting the first shipping cost and the second shipping cost to the third party supplier.

An exemplary non-transitory computer-readable storage medium configured according to principles described herein can having instructions stored which, when executed by a computing device, cause the computing device to perform operations including: applying a machine learning algorithm to historical sales data for a third party e-commerce product, to yield a predicted demand quantity for the third party e-commerce product at a plurality of retail locations; calculating a first shipping cost for receiving the predicted demand quantity from a third party supplier of the third party e-commerce product at a single retail location in the plurality of retail locations, and subsequently redistributing the predicted demand quantity to remaining retail locations in the plurality of retail locations; calculating a second shipping cost for receiving the predicted demand quantity from the third party supplier at a distribution center and redistributing the predicted demand quantity to remaining retail locations in the plurality of retails locations; and transmitting the first shipping cost and the second shipping cost to the third party supplier.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

FIG. 5 illustrates an exemplary computer system.

DETAILED DESCRIPTION

Figure 1:
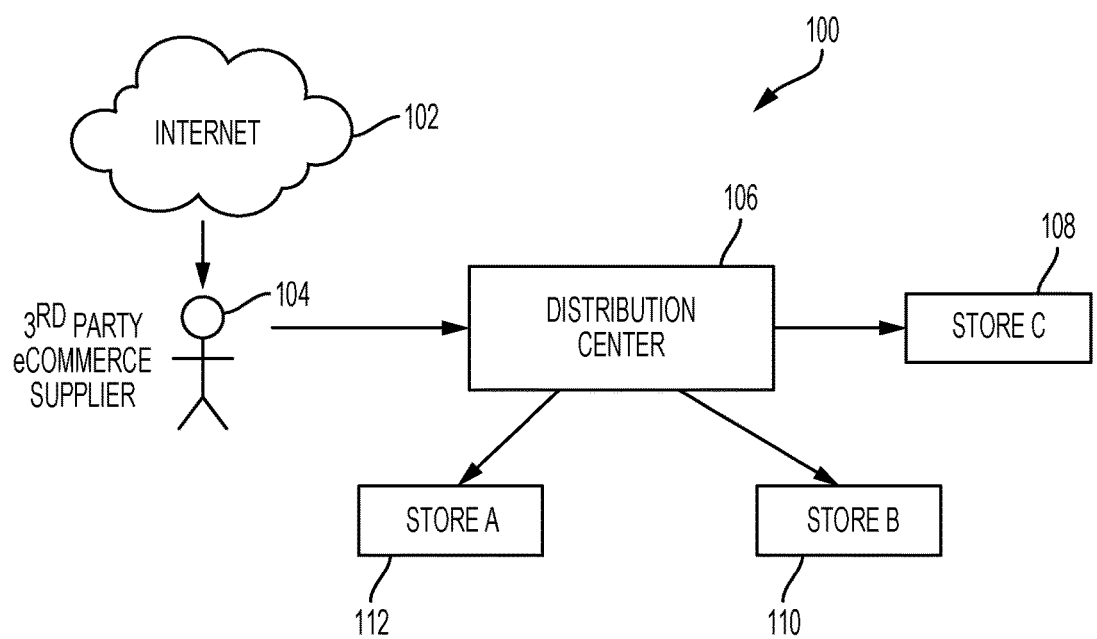
FIG. 1 illustrates a first exemplary product distribution system.

As used herein, the term "retailer" or "retail marketplace" may refer to an entity that offers products for sale to consumers, sometimes referred to as end users, on a retail level. The products offered for sale by retailers may include its own products, products purchased from partners, or products offered by partners for sale even though title to the products has not been formally transferred to the retailer. A store, or retail location, as used herein is a "brick-and-mortar" store, meaning that consumers may visit the location to select merchandise for purchase.

As used herein, the term "distribution center" may refer to an operation that includes a warehouse for storing and managing inventory of products. In some configurations, the distribution centers may physically manage inventory of product offered for sale by others, including partners, third party suppliers (including e-commerce suppliers), and retailers. That is, distribution centers may fulfill shipping orders from retailers and partners.

As used herein, transports and transport vehicles are mechanisms used for moving goods between distribution centers and retail locations. While in some cases this can be a direct distribution (i.e., a truck moves goods directly from the distribution center to the retail location), in other cases the distribution can be indirect (i.e., a train moves goods from a distribution center to an intermediate distribution center, where a truck receives the goods and delivers them to retail locations). Exemplary transports can therefore include trucks and trains, as well as air transport such as planes and aerial drones. Automated, self-driving trucks and/or drones are likewise within the scope of this disclosure.

Systems, methods and computer-readable media configured as disclosed herein can provide e-commerce suppliers an alternative shipping and distribution system based on real-time sales and demand being coupled with iterative machine learning processes. As an example, an e-commerce supplier can contract with a retailer to have products sold in retail locations belonging to the retailer. However, rather than the retailer providing to the e-commerce supplier a quoted price for acquiring the merchandise, the retailer can provide two prices: one for if the e-commerce supplier delivers the merchandise to a distribution center, and another if the e-commerce supplier delivers the merchandise directly to a retail location, from which the retailer will redistribute the merchandise to other retail locations. The price quoted by the retailer for the e-commerce supplier delivering merchandise directly to the retail location can use real-time factors such as sales, an affinity score to other similar products, demographics of a sales area, calendar information, demand for the product calculated using time series modeling, regression modeling, and/or machine learning modeling, and an availability of the products.

Consider an additional example. An e-commerce product supplier, who does not have a brick and mortar retail location, wishes to sell products in a brick and mortar store. The e-commerce product supplier contracts with a retailer that has various retail locations. Under some product distribution systems, the retailer and the e-commerce product supplier would negotiate a price for the product which would require the e-commerce product supplier to deliver the product to a distribution center associated with the retailer. The retailer would then move the product from the distribution center to desired retail locations based on predicted demand for the product at those retail locations. However, such systems often require the e-commerce product supplier to spend potential profits on transporting the merchandise to the distribution center when a retail location is located closer to the e-commerce supplier. In addition, by using two distribution systems (one for a third party shipping company to deliver the merchandise to the distribution center, and another for the retailer to distribute the merchandise from the distribution center to the retailers), inefficiencies can occur.

To remedy waste associated with such distribution mechanisms, systems configured as disclosed herein allow the retailer to provide multiple quotes to the e-commerce product supplier based on where merchandise is delivered. For example, the retailer may provide to the e-commerce product supplier a quote for purchasing a product if the e-commerce product supplier delivers the product to the distribution center, and a distinct quote if the e-commerce product supplier delivers the product to a retail location. In the latter case, the retailer would then assign a transport vehicle to collect merchandise which needs to be distributed to other retail locations from the retail location at which the product was delivered. Once the e-commerce product supplier receives the offers, they may evaluate the prices and locations of the retail locations. It may be determined that delivering products to a retail location rather than the distribution center makes business sense. If, for example, the e-commerce product supplier has a factory near to a retail location of the retailer, the e-commerce product supplier may determine that delivering products to the retail location makes more sense than delivering the product to the distribution center.

When the product is delivered to a retail location, the retailer is then responsible for collecting the delivered merchandise and distributing the products to other retail locations. Generally, this takes the form of a transport vehicle being assigned to collect the merchandise from the retail location where the product was delivered (minus any product which is to remain in that retail location), move the product to a distribution center, and finally redistribute the product to the other retail locations. In another embodiment, the product may be distributed from one retail locations to another. In this manner, the e-commerce product supplier may maximize reliance on the distribution system of the retailer throughout the entire product distribution process, rather than relying on a third-party shipping company (such as UPS®, Federal Express®, etc.).

Identifying the amount of merchandise which is to remain at the initial retail location where merchandise is delivered by the e-commerce product supplier, or the amount of merchandise which needs to be collected and redistributed to other retail locations, can be based on using multiple prediction models in parallel. These models can, for example, rely on real-time data regarding current store inventories, historical sales information, calendar information, marketing information, affinity scores, and machine-learning to predict what the demand will be for a product at a given location. Exemplary models which can be performed in parallel can include time-series models, regression models, and/or machine learning algorithms such as a gradient boost model. The quotes which are then provided by the retailer to the e-commerce product provider for the merchandise can use the predicted demand for each store, as well as real-time data associated with the costs of transporting merchandise from one location to another.

The affinity score used to calculate predicted demand and/or costs can be based on how similar an item is to other products. To determine how similar a product is to other products, a similarity index can be used. In the similarity index, attributes such as color, weight, volume, product type, color, brand, etc. are registered. In making a similarity comparison between products, each of the attributes in the similarity index can be weighted and used to calculate the level of similarity of the products. If the products have a high enough level of calculated similarity, they may be considered replacement products. For example, comparing a wooden chair to a candy bar using the similarity index could result in an affinity score which is computed: affinity score=0.2*color difference+0.2*brand difference+0.2*size difference+0.4*product type difference. Because a chair and a candy bar are likely to have large distinctions in brand, size, and product types, the affinity score in this example will be quite large (indicating that the products are not similar). By contrast, a similar comparison of two types of candy bars is likely to result in smaller distinctions, and therefore a smaller affinity score will result (indicating that the products are more similar) should the same weighted equation (or a similar equation) be used to determine affinity of a product to other products.

Demographics can likewise be used by the time series models, the regression models, and the machine learning models to determine predicted demand. For example, if a product is associated with a rural population, then the predicted demand for the product will be higher in rural retail locations than in urban retail locations Likewise, if the product is associated with a particular ethnic group, then the predicted demand for the product may be higher in retail locations near population centers having a significant population of that particular ethnic group. Exemplary demographics which can be used by the system to calculate predicted demand include age of common purchasers of the product, ethnicities associated with the product, wealth of common purchasers of the product, education of common purchasers of the product, and geographic locations of common purchasers of the product.

A time series model uses a series of data points indexed in time order, where between each data point is an equal amount of time. By entering previous data points into the model, future values can be predicted. A regression model can be used in combination with a time series model to test relationships between variables and data points. These modeling techniques can be used to predict, based on historical and real-time data, demand for a product. Machine learning models make similar predictions based on the historical data, but overcome following strictly static program instructions by making data driven predictions or decisions. As predictions are made and subsequent results received, the machine learning model iteratively updates its parameters, improving the code used to make determinations.

By performing time series and regression modeling in parallel with machine learning models, systems configured according to this disclosure can select from the predictive model which has consistently provided the best results, or which has provided the most consistent results recently. For example, over long periods of time, the machine learning models might provide higher accuracy than the time series and regression modeling. However, when something changes which dramatically effects the rate of sales for an item (i.e., moving the item to a different shelf or location in the store, or a negative news report effects consumer demand), the time series and regression modeling might be better equipped to accurately model the predicted demand.

In some configurations, the iterative updates to the machine learning algorithm are tailored based on distinct aspects of the data being received. For example, in some configurations, the timeframe for which data is available, as well as the seasonality of the data (i.e., how often certain patterns appear in the data, such as weekly, monthly, quarterly, annually), are used to define sets of data and train the machine learning algorithm. In a preferred configuration, the sets used to train the algorithm represent both a good portion of the overall data as well as the seasonality of the data. For example, if the system has three years of data with an annual seasonality/pattern, the system can use two years as a training set and one year as a testing set, whereas if the three years of data had a monthly seasonality/pattern, the system could use 32 months as training data and four months as a testing set. The seasonality in the data can also contribute to the frequency of the iterative updates. Fast changing items and categories would require more frequent updates compared to more stable items and categories. Each iteration would bring in, for example, newly added historical data, and from that newly added historical data, the machine learning algorithm can provide updated forecasts of demand.

By using iterative machine learning, the supply chain can become more efficient and robust, and the supply chain can adapt to changing demands, supply, etc. For example, the disclosed systems and methods improve ease of access because there are more retail locations than distribution centers. In particular, this can be a benefit to small, local businesses as they can easily drop off their merchandise at the stores using their personal vehicles, rather than relying on carrier shipping. Moreover, those small businesses can have more flexibility in scheduling deliveries, as retail locations can have more flexible delivery hours than that of a distribution center. In addition, in cases where the store is going to retain the delivered product, the store will have already received the product directly from the supplier, which can be helpful when products may have a short shelf life (i.e., locally grown food/produce).

The concepts disclosed herein can also be used to improve the computing systems which are performing, or enabling the performance, of the disclosed concepts. For example, information associated with routes, deliveries, truck cargo, distribution center inventory or requirements, retail location inventory or requirements, etc., can be generated by local computing devices. In a standard computing system, the information will then be forwarded to a central computing system from the local computing devices. However, systems configured according to this disclosure can improve upon this "centralized" approach.

One way in which systems configured as disclosed herein can improve upon the centralized approach is combining the data from the respective local computing devices prior to communicating the information from the local computing devices to the central computing system. For example, a truck traveling from a distribution center to a retail location may be required to generate information about (1) the route being travelled, (2) space available in the truck for additional goods, (3) conditions within the truck, etc. Rather than transmitting each individual piece of data each time new data is generated, the truck processor can cache the generated data for a period of time and combine the generated data with any additional data which is generated within the period of time. This withholding and combining of data can conserve bandwidth due to the reduced number of transmissions, can save power due to the reduced number of transmissions, and can increase accuracy due to holding/verifying the data for a period of time prior to transmission.

Another way in which systems configured as disclosed herein can improve upon the centralized approach is adapting a decentralized approach, where data is shared among all the individual nodes/computing devices of the network, and the individual computing devices perform calculations and determinations as required. In such a configuration, the same truck described above can be in communication with the retail location and the distribution center, and can make changes to the route, destination, pickups/deliveries, etc., based on data received and processed while enroute between locations. Such a configuration may be more power and/or bandwidth intensive than a centralized approach, but can result in a more dynamic system because of the ability to modify assignments and requirements immediately upon making that determination. In addition, such a system can be more secure, because there are multiple points of failure (rather than a single point of failure in a centralized system).

It is worth noting that a "hybrid" system might be more suitable for some specific configurations. In this approach, a part of the network/system would be using the centralized approach (which can take advantage of the bandwidth savings described above), while the rest of the system is utilizing a de-centralized approach (which can take advantage of the flexibility/increased security described above). For instance, the trucks could be connected to a central server at the distribution center, while that server is connected to a decentralized network of store computers.

Various embodiments of the disclosure are described in detail below. While specific implementations are described, it should be understood that this is done for illustration purposes only. Other components and configurations may be used without parting from the spirit and scope of the disclosure. In addition, individual components and concepts from the specific configurations and embodiments disclosed herein may be used by other configurations and embodiments disclosed herein, or removed from the configurations in which they are described, without parting from the spirit of this disclosure.

FIG. 1 illustrates a first exemplary product distribution system 100. In this example 100, a third party e-commerce supplier 104 receives and processes orders from the Internet 102. The third party e-commerce supplier 104 also negotiates to have their product(s) sold in retail stores 108-112 belonging to a retailer. To get the product(s) to the retail stores 108-112, the third party e-commerce supplier 104 arranges for the product(s) to be delivered to a distribution center 106 associated with the retailer. The retailer then transports the product(s) from the distribution center 106 to the individual retail stores 108-112.

Figure 2:
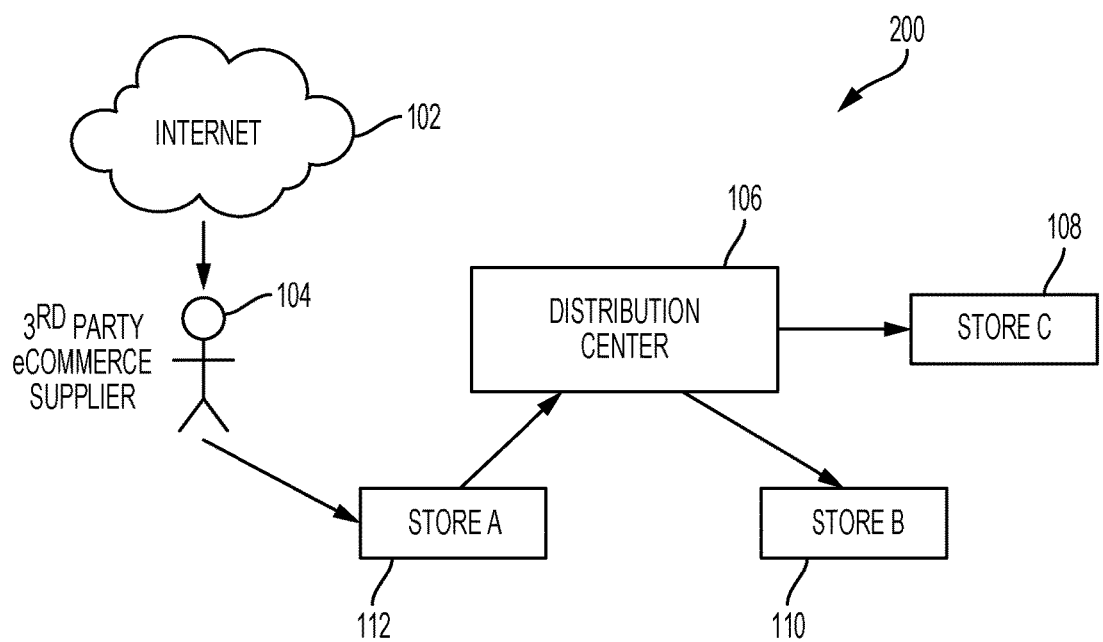
FIG. 2 illustrates a second exemplary product distribution system.

FIG. 2 illustrates an alternative exemplary product distribution system 200. In this example 200, the third party e-commerce supplier 104 continues to receive and process orders from the Internet 102, and also has negotiated with a retailer to have their product(s) sold in retail stores 108-112. However, unlike the distribution system 100 of FIG. 1, in this example 200 the third party e-commerce supplier 104 delivers the product(s) to a retail location, Store A 112. Once the product(s) are received at Store A 112, the retailer collects any merchandise not needed at Store A 112 and transports that remaining merchandise to a distribution center 106 associated with the retailer. The retailer then transports product(s) from the distribution center 106 to the remaining retail locations 108, 110 according to the predicted demand for the product(s) at the respective stores. In this manner, the third party e-commerce supplier 104 can (potentially) save time and money in getting the product(s) to the retailer, and the retailer does not need to distribute those product(s) to Store A 112. In addition, the product may be distributed from Store A to Stores B and C without going to the distribution center.

Figure 3:
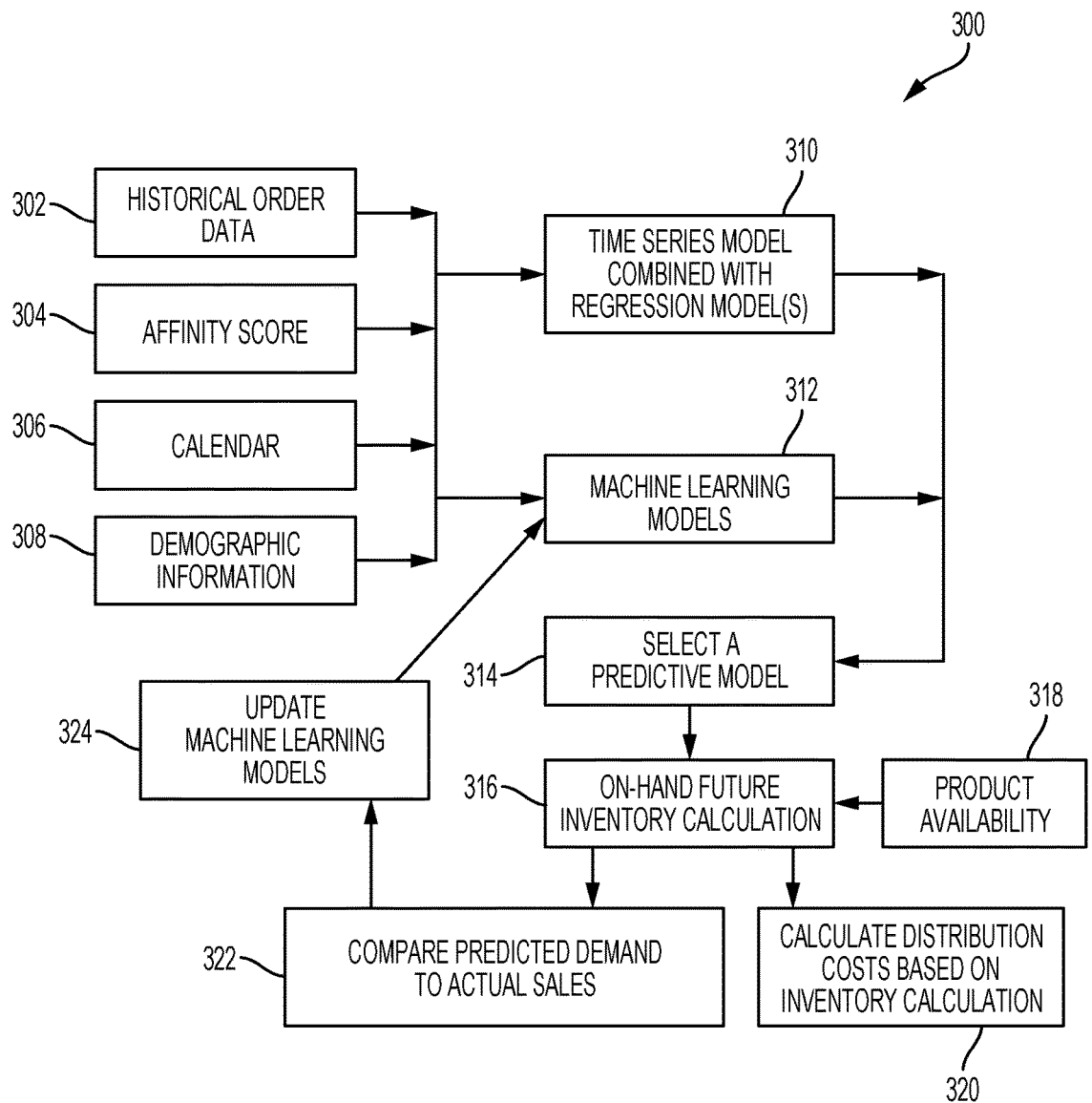
FIG. 3 illustrates a flowchart illustrating using machine learning in parallel with time series and regression modeling to predict demand.

FIG. 3 illustrates a flowchart 300 illustrating using machine learning 312 in parallel with time series and regression modeling 310 to predict demand for a product. In this example 300, both the time series and regression modeling 310 and the machine learning 312 have access to information such as historical order data 302, affinity scores 304 which reflect how similar the product in question is to other products, calendar information 306 (indicating weekdays versus weekends, holidays, seasons, etc.), and demographic information 308 associated with the product. Additional information used by the time series and regression models 310, as well as the machine learning models 312, can include real-time inventory levels of the product in the stores, real-time inventory levels in distribution centers, real-time inventory in transit, time since release of the product (i.e., demand for the product may decrease from release), marketing information, and/or information associated with a replacement product being released soon (i.e., end of season products, new movie releases, etc.).

As the machine learning models 312 make demand predictions in parallel with the time series and regression modeling 310, the Rsystem makes a selection of a predictive model 314. This selection can, for example, be based on overall patterns of prediction or can be based on patterns of prediction associated with specific factors. For example, a particular machine learning model may excel at predictions over holidays, but may be of lesser quality than other models for other days of the year Likewise, a particular model may have the best overall prediction record, but may have been inaccurate over the previous two weeks (or other period of time). In such a scenario, the system may select a distinct model to calculate predicted demand for the respective retail store locations.

The system then calculates the on-hand future inventory 316 based on the predicted demand and the product availability 318. In other words, the system is determining how many product units should be at each retail location based on (1) the amount available 318 from the e-commerce product supplier and (2) the predicted demand calculated by the chosen model 314.

Using that predicted on-hand future inventory 316, the system calculates the distribution costs 320, which can in turn be used by the retailer in providing quotes to the e-commerce product supplier. The on-hand future inventory 316 prediction and demand are saved and, over time, compared to actual sales 322. Using that information, the machine learning models 312 are iteratively updated 324, and improve the way the models use the data 302-308 to predict demand. These determinations may be based on groupings of the retail locations and distribution centers. The retail stores and distribution centers may be organized into groups or regions based on geography or other considerations. A distribution center may service the retail locations in its region. The inventory and costs may be determined based on the costs to transport the products within or across regions.

Figure 4:
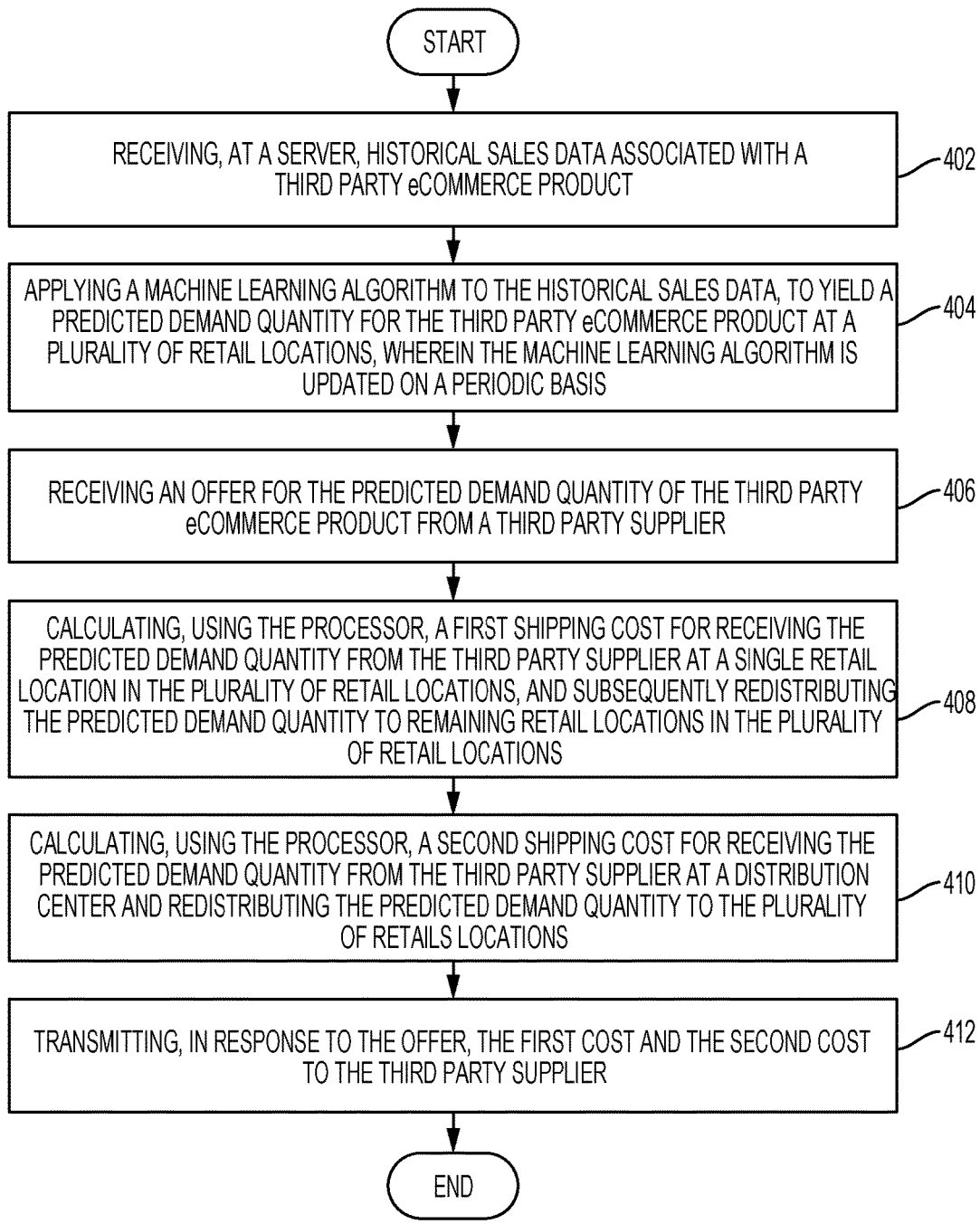
FIG. 4 illustrates an exemplary method embodiment.

FIG. 4 illustrates an exemplary method embodiment. The steps outlined herein are exemplary and can be implemented in any combination thereof, including combinations that exclude, add, or modify certain steps. The method can, for example, be performed by a server or other computing system configured to receive multiple real-time data feeds and/or configured to retrieve data simultaneously from multiple databases or data sources (such as inventory information from retail locations), and can provide third party suppliers multiple price costs for distributing a product from distinct points of distribution. The exemplary method can include receiving, at a server, historical sales data associated with a third party e-commerce product (402). The server can apply applying a machine learning algorithm to the historical sales data, to yield a predicted demand quantity for the third party e-commerce product at a plurality of retail locations, wherein the machine learning algorithm is updated on a periodic basis (404), and receive an offer for the predicted demand quantity of the third party e-commerce product from a third party supplier (406).

The server can then calculate, using a processor, a first shipping cost for receiving the predicted demand quantity from the third party supplier at a single retail location in the plurality of retail locations, and subsequently redistributing the predicted demand quantity to remaining retail locations in the plurality of retail locations (408). The server can also calculate, using the processor, a second shipping cost for receiving the predicted demand quantity from the third party supplier at a distribution center and redistributing the predicted demand quantity to remaining retail locations in the plurality of retails locations (410) and transmit, in response to the offer, the first shipping cost and the second shipping cost to the third party supplier (412). As noted above, the costs may be based on historical data for the same or similar items using the affinity score.

In certain configurations, the method can be augmented to further include receiving, at the server, electronic messages indicating inventory amounts of the third party e-commerce product from the plurality of retail locations, wherein the machine learning algorithm uses the inventory amounts in predicting the predicted demand quantity for the third party e-commerce product at the plurality of retail locations.

In yet other configurations, the method can be modified to further include applying, in parallel to the machine learning algorithm, the historical sales data to a time series and regression model, to yield a second predicted demand quantity in addition to the predicted demand quantity generated by the machine learning algorithm; and selecting, based on historical accuracy, one of the predicted demand quantity generated by the machine learning algorithm and the second predicted demand quantity, for use in calculating the first shipping cost and the second shipping cost.

In some configurations, the machine learning algorithm can include: combining time series information contained within the historical sales data with a plurality of regression models, to yield a plurality of sales forecasts; recording the plurality of sales forecasts in a database, to yield stored sales forecasts; selecting, based on past performance of the machine learning algorithm, a sales forecast from the plurality of sales forecasts; and upon receiving additional data, updating the machine learning algorithm using the additional data, the historical sales data, and the stored sales forecasts.

The difference between the first shipping cost and the second shipping cost can represent a cost of transporting goods from the single retail location to the distribution center and subsequently from the distribution center to the remaining retail locations. In addition, it is noted that the distribution center does not sell goods directly to customers, while the plurality of retail locations do sell goods directly to customers.

With reference to FIG. 5, an exemplary system 500 which can be used to practice the concepts disclosed herein. The exemplary system 500 illustrated contains a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method for providing third party suppliers multiple price costs for distributing a product from distinct points of distribution, the method comprising:
   receiving, at a server, historical sales data associated with a third party e-commerce product;
   applying a machine learning algorithm to the historical sales data, to yield a predicted demand quantity for the third party e-commerce product at a plurality of retail locations, wherein the machine learning algorithm is updated on a periodic basis;
   calculating, using a processor of the server, a first shipping cost for:
      (1) receiving the predicted demand quantity from the third party supplier at a single retail location in the plurality of retail locations; and
      (2) subsequently redistributing the predicted demand quantity from the single retail location to remaining retail locations in the plurality of retail locations;
   calculating, using the processor, a second shipping cost for:
      (1) receiving the predicted demand quantity from the third party supplier at a distribution center; and
      (2) redistributing the predicted demand quantity to remaining retail locations in the plurality of retails locations;
   determining, via the processor and based on the first shipping cost and the second shipping cost, that distribution from the single retail location results in cost savings, resulting in a determination; and
   based on the determination:
      receiving the third party e-commerce product from the third party supplier at the single retail location; and
      redistributing, using the processor and based on the cost savings, the third party e-commerce product from the single retail location to the plurality of retail locations according to the predicted demand quantity for each respective retail location.

2. The method of claim 1, further comprising:
   receiving, at the server, electronic messages indicating inventory amounts of the third party e-commerce product from the plurality of retail locations,
   wherein the machine learning algorithm uses the inventory amounts in predicting the predicted demand quantity for the third party e-commerce product at the plurality of retail locations.

3. The method of claim 1, further comprising:
   applying, in parallel to the machine learning algorithm, the historical sales data to a time series and regression model, to yield a second predicted demand quantity in addition to the predicted demand quantity generated by the machine learning algorithm; and
   selecting, based on historical accuracy, one of the predicted demand quantity generated by the machine learning algorithm and the second predicted demand quantity, for use in calculating the first shipping cost and the second shipping cost.

4. The method of claim 1, wherein the machine learning algorithm further comprises:
   combining time series information contained within the historical sales data with a plurality of regression models, to yield a plurality of sales forecasts;
   recording the plurality of sales forecasts in a database, to yield stored sales forecasts;
   selecting, based on past performance of the machine learning algorithm, a sales forecast from the plurality of sales forecasts; and
   upon receiving additional data, updating the machine learning algorithm using the additional data, the historical sales data, and the stored sales forecasts.

5. The method of claim 1, wherein the distribution center does not sell goods directly to customers and wherein the plurality of retail locations do sell goods directly to customers.

6. The method of claim 1, wherein the server is configured to receive real-time updates of amounts of the third party e-commerce product at the plurality of retail locations.

7. A system comprising:
   a processor; and
   a computer-readable storage medium having instructions stored which, when executed by the processor, cause the processor to perform operations comprising:
      applying a machine learning algorithm to historical sales data for a third party e-commerce product, to yield a predicted demand quantity for the third party e-commerce product at a plurality of retail locations;
      calculating a first shipping cost for receiving the predicted demand quantity from a third party supplier of the third party e-commerce product at a single retail location in the plurality of retail locations, and subsequently redistributing the predicted demand quantity to remaining retail locations in the plurality of retail locations;
      calculating a second shipping cost for receiving the predicted demand quantity from the third party supplier at a distribution center and redistributing the predicted demand quantity to remaining retail locations in the plurality of retails locations;
      determining, based on the first shipping cost and the second shipping cost, that distribution from the single retail location results in cost savings, resulting in a determination; and
      based on the determination:
         causing the third party supplier to deliver the third party e-commerce product at the single retail location; and
         causing, based on the cost savings, the third party e-commerce product to be redistributed from the single retail location to the plurality of retail locations according to the predicted demand quantity for each respective retail location.

8. The system of claim 7, the computer-readable storage medium having additional instructions stored which, when executed by the processor, cause the processor to perform operations comprising:
   receiving electronic messages indicating inventory amounts of the third party e-commerce product from the plurality of retail locations,
   wherein the machine learning algorithm uses the inventory amounts in predicting the predicted demand quantity for the third party e-commerce product at the plurality of retail locations.

9. The system of claim 7, wherein the historical sales data further comprises:
   an affinity score for the third party e-commerce product;
   a calendar of events and promotions associated with the third party e-commerce product;
   demographic information associated with each retail location in the plurality of retail locations.

10. The system of claim 7, wherein the machine learning algorithm further comprises:
- combining time series information contained within the historical sales data with a plurality of regression models, to yield a plurality of sales forecasts;
- recording the plurality of sales forecasts in a database, to yield stored sales forecasts;
- selecting, based on past performance of the machine learning algorithm, a sales forecast from the plurality of sales forecasts; and
- upon receiving additional data, updating the machine learning algorithm using the additional data, the historical sales data, and the stored sales forecasts.

11. The system of claim 7, wherein the distribution center does not sell goods directly to customers and wherein the plurality of retail locations do sell goods directly to customers.

12. The system of claim 7, wherein the processor is configured to receive real-time updates of amounts of the third party e-commerce product at the plurality of retail locations.

13. A non-transitory computer-readable storage medium having instructions stored which, when executed by a computing device, cause the computing device to perform operations comprising:
- applying a machine learning algorithm to historical sales data for a third party e-commerce product, to yield a predicted demand quantity for the third party e-commerce product at a plurality of retail locations;
- calculating a first shipping cost for receiving the predicted demand quantity from a third party supplier of the third party e-commerce product at a single retail location in the plurality of retail locations, and subsequently redistributing the predicted demand quantity to remaining retail locations in the plurality of retail locations;
- calculating a second shipping cost for receiving the predicted demand quantity from the third party supplier at a distribution center and redistributing the predicted demand quantity to remaining retail locations in the plurality of retails locations;
- determining, based on the first shipping cost and the second shipping cost, that distribution from the single retail location results in cost savings, resulting in a determination; and
- based on the determination:
  - causing the third party supplier to deliver the third party e-commerce product at the single retail location; and
  - causing, based on the cost savings, the third party e-commerce product to be redistributed from the single retail location to the plurality of retail locations according to the predicted demand quantity for each respective retail location.

14. The non-transitory computer-readable storage medium of claim 13, having additional instructions stored which, when executed by the computing device, cause the computing device to perform operations comprising:
- receiving electronic messages indicating inventory amounts of the third party e-commerce product from the plurality of retail locations,
- wherein the machine learning algorithm uses the inventory amounts in predicting the predicted demand quantity for the third party e-commerce product at the plurality of retail locations.

15. The non-transitory computer-readable storage medium of claim 13, wherein the historical sales data further comprises:
- an affinity score for the third party e-commerce product;
- a calendar of events and promotions associated with the third party e-commerce product;
- demographic information associated with each retail location in the plurality of retail locations.

16. The non-transitory computer-readable storage medium of claim 13, wherein the machine learning algorithm further comprises:
- combining time series information contained within the historical sales data with a plurality of regression models, to yield a plurality of sales forecasts;
- recording the plurality of sales forecasts in a database, to yield stored sales forecasts;
- selecting, based on past performance of the machine learning algorithm, a sales forecast from the plurality of sales forecasts; and
- upon receiving additional data, updating the machine learning algorithm using the additional data, the historical sales data, and the stored sales forecasts.

17. The non-transitory computer-readable storage medium of claim 13, wherein the distribution center does not sell goods directly to customers and wherein the plurality of retail locations do sell goods directly to customers.

* * * * *